United States Patent

Bocq

(10) Patent No.: US 8,907,946 B2
(45) Date of Patent: Dec. 9, 2014

(54) METHOD FOR CONTROLLING MOTIONS OF AN OBJECT IN A 3-DIMENSIONAL VIRTUAL ENVIRONMENT

(75) Inventor: Sébasien Bocq, Woluwe-Saint-Lambert (BE)

(73) Assignee: Alcatel Lucent, Boulogne-Billancourt (FR)

( * ) Notice: Subject to any disclaimer, the term of this patent is extended or adjusted under 35 U.S.C. 154(b) by 173 days.

(21) Appl. No.: 13/581,181

(22) PCT Filed: Feb. 16, 2011

(86) PCT No.: PCT/EP2011/052287
§ 371 (c)(1),
(2), (4) Date: Aug. 24, 2012

(87) PCT Pub. No.: WO2011/104154
PCT Pub. Date: Sep. 1, 2011

(65) Prior Publication Data
US 2012/0313935 A1   Dec. 13, 2012

(30) Foreign Application Priority Data

Feb. 26, 2010 (EP) .................................. 10305200

(51) Int. Cl.
*G06T 15/00* (2011.01)
*G06F 3/0488* (2013.01)
*G06T 15/10* (2011.01)
*G06F 3/0481* (2013.01)
*G06F 3/0484* (2013.01)

(52) U.S. Cl.
CPC ............ *G06F 3/04886* (2013.01); *G06T 15/10* (2013.01); *G06F 3/04815* (2013.01); *G06F 3/04883* (2013.01); *G06F 3/04847* (2013.01)
USPC ........... 345/419; 345/156; 345/173; 345/204; 345/672; 709/227

(58) Field of Classification Search
CPC .......... G06T 15/10; G06F 3/048; H04L 61/00
USPC .......... 345/419, 156, 173, 204, 672; 709/227
See application file for complete search history.

(56) References Cited

U.S. PATENT DOCUMENTS 7,477,243 B2 *   1/2009   Ogawa et al. ................. 345/204
8,417,822 B2 *   4/2013   Edecker et al. ............... 709/227
(Continued)

OTHER PUBLICATIONS

International Search Report for PCT/EP2011/052287 dated Mar. 25, 2011.

*Primary Examiner* — Phu K Nguyen
(74) *Attorney, Agent, or Firm* — Fay Sharpe LLP

(57) ABSTRACT

The present invention relates to a method, system and devices for controlling motions of an object in a 3-dimensional Virtual Environment by a Human Interface Device of a user browsing a 3-dimensional Virtual Environment. The human interface device being coupled to a client device for accessing the 3-dimensional Virtual Environment. The 3-dimensional Virtual Environment being deployed at, at least one application server. The client device and the at least one application server being coupled over a communication link. This method first determines a starting point at a 2-dimensional surface by detecting a location of a pointer at the 2-dimensional surface and subsequently based on the starting point allocates a first inner area on the surface surrounding the starting point, a second area on the surface surrounding the first area and a third area on the surface, surrounding the second area. Further, an object motion control instruction is generated based on the motion of the pointer and the object motion control function associated to the area wherein the motion occurs is detected.

10 Claims, 4 Drawing Sheets

(56) References Cited

U.S. PATENT DOCUMENTS

| | | | |
|---|---|---|---|
| 8,539,085 B2 * | 9/2013 | Edecker et al. | 709/227 |
| 8,674,948 B2 * | 3/2014 | Han et al. | 345/173 |
| 8,698,735 B2 * | 4/2014 | Sullivan | 345/156 |
| 2007/0075985 A1 | 4/2007 | Niida | |
| 2007/0097114 A1 | 5/2007 | Kim et al. | |
| 2010/0045666 A1 | 2/2010 | Kornmann et al. | |
| 2011/0275439 A1 | 11/2011 | Terada et al. | |

* cited by examiner

METHOD FOR CONTROLLING MOTIONS OF AN OBJECT IN A 3-DIMENSIONAL VIRTUAL ENVIRONMENT

The present invention relates to a Method for controlling motion of an object in a 3-Dimensional Virtual Environment as described in the preamble of claim 1, the system as described in the preamble of claim 5.

Currently, moving accurately, smoothly and intuitively objects in a 3-Dimensional virtual environment require either Human Interface Devices, further referred to as HID, specifically tailored for virtual reality and/or the coordination of the two hands of a person, each hand controlling two degrees of freedom on an analog input device.

The well known console pads used for motion control of objects in 3-Dimensional Virtual Environment, that sports two analog joysticks is the solution implemented in classical home gaming systems. Each analog joystick permits two degrees of freedom each. The interaction scheme depends on the usability requirements of the target application but a typical control scheme for avatars in 3D virtual worlds is one joystick (usually the left one) to control the linear motion of the avatar and the other joystick (usually the right one) to control the motion of the camera angle.

More disruptive control devices like the one sported by the Nintendo Wii require also the coordination of both hands to capture motion in a 3-D world: one hand controls 2 degrees of freedom via the analog stick present on the Nunchuck and the other hand controls 2 extra degrees of freedom by tilting the Wii-remote, Furthermore, US patent application publication, with publication number US 2004/0260507, published on Dec. 23, 2004 discloses a dedicated sensor hardware for measuring angular and linear velocity whereas more advanced tracking technologies used in professional virtual reality VR systems capture the full six degrees of freedom in high fidelity but using costly, dedicated and complex equipment.

In a further US patent application publication with publication number US 2009/0209343 published on Aug. 20, 2009 discloses a camera system that works by translating hand and body motions into an avatars motions in Second Life. Tip a bit forward and the avatar will walk, tip faster and the avatar will run, tip too fast and you'll fall down.

Each of the previously described systems for controlling motion of objects in 3-Dimensional environments are disadvantageous in that relatively complex systems are required for controlling this motion where the complexity is in the system required, i.e. the camera setup and processing environment for analyzing gestures of a person, and the level of body coordination required for controlling the motion of objects in a 3-Dimensional world.

An objective of the present invention is to provide a Method for controlling motions of an object in a 3-Dimensional Virtual Environment of the above known type but wherein complexity of the system for controlling an object in such a 3-Dimensional Virtual Environment is reduced.

According to the present invention, this object is achieved by the method according to claim 1, the system according to claim 5, Object Motion control Module according to claim 7, a related Client device according to claim 9 and a related Human interface device according to claim 10.

Indeed by first determining a starting point on a 2-dimensional surface by detecting an initial location of a pointer on the 2-dimensional surface and based on this starting point determined, allocating a first area on the 2-dimensional surface surrounding the starting point, allocating a second area, on the 2-dimensional surface, surrounding said first area and allocating a third area on the surface, in turn surrounding the second area, subsequently assigning an object motion control function to each allocated area based on the continuous motion of the pointer on the surface and an object motion control function associated with the area wherein the motion is detected an object motion control instruction is generated.

The second area allocated is an allocated area not including the first allocated area and the third allocated area is an allocated area not including the first and second allocated area.

An Additional advantage of the present invention is that only single hand interactions are required and that the solution easily may be implemented using off-the-shelf hardware (e.g. a touch sensitive surface), permitting three degrees of freedom and allowing to control the angular and linear velocity of an object in an 3-Dimensional environment which is sufficient for casual gamers or for navigating 3D virtual environments in an intuitive manner Another characteristic feature of the present invention is described in claim 2, claim 6 and claim 8.

If the motion of the pointer occurs within the first allocated area the object motion control function implies no motion of the object in the 3-dimensional Virtual Environment, if the motion of the pointer is detected within the second area the object motion control function implies only an angular motion of the object in the 3-dimensional Virtual Environment is involved/instructed, where the angular velocity is derived from the motion of the pointer, or in case the motion of the pointer is detected within the third area, the object motion control function implies involves/instructs a rotational and linear motion of the object in the 3-dimensional Virtual Environment is involved/instructed where the angular and linear velocity is derived from the motion of the pointer.

It is to be noticed that the term 'comprising', used in the claims, should not be interpreted as being restricted to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

The above and other objects and features of the invention will become more apparent and the invention itself will be best understood by referring to the following description of an embodiment taken in conjunction with the accompanying drawings wherein.

Figure 3A:
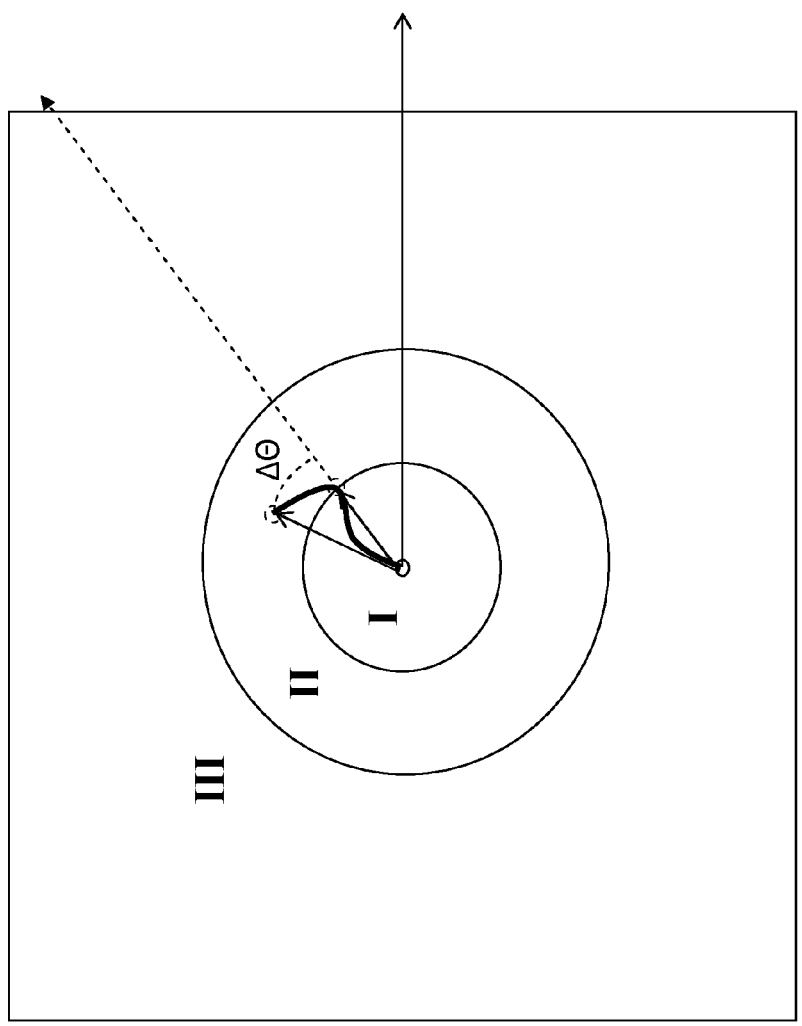
FIG. 3a represents the 2 dimensional surface whereon the starting point and the first, second and third areas are allocated.
Figure 3B:
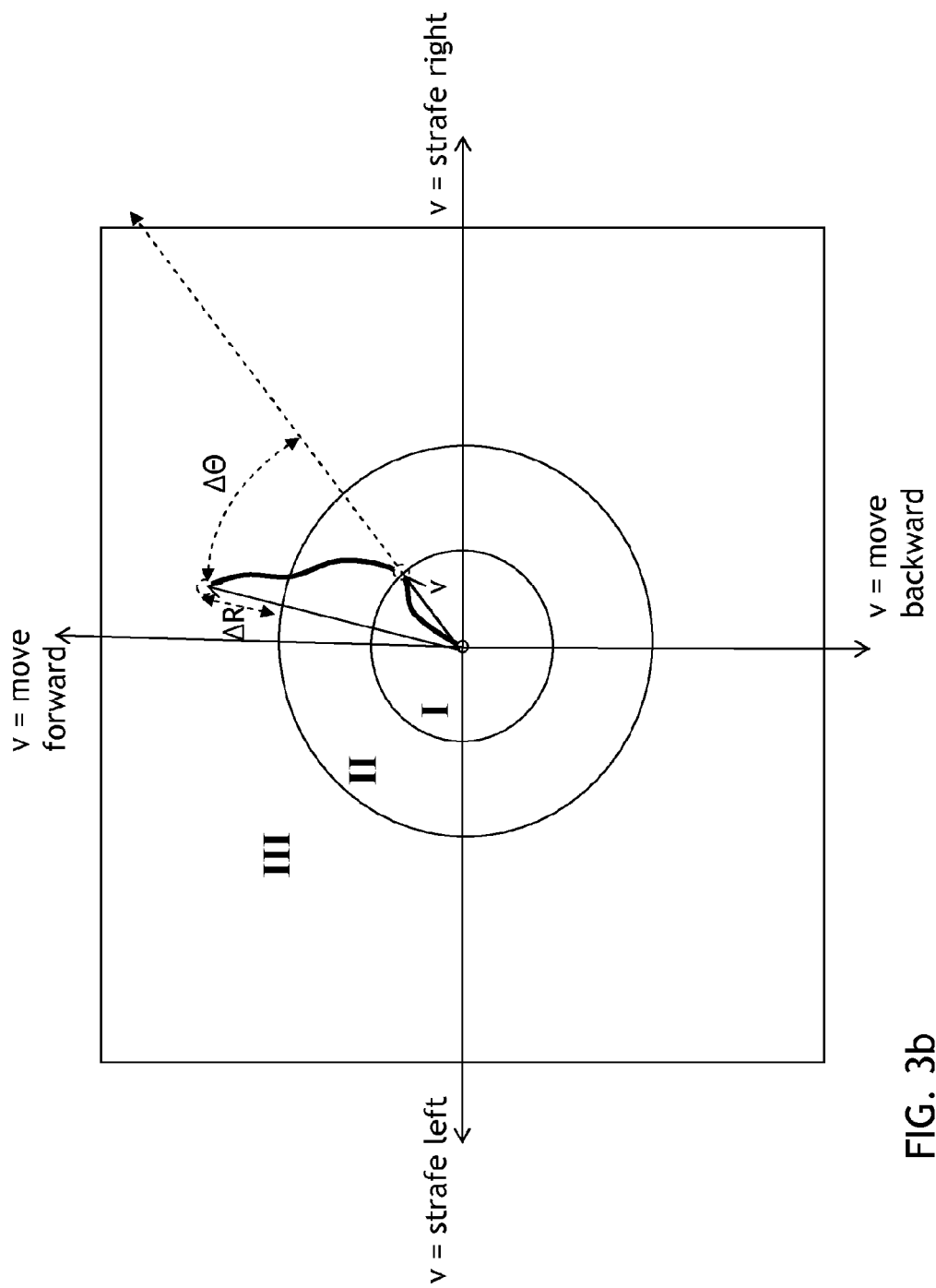

FIG. 3b further represents a motion of the pointer on the 2 dimensional surface relatively to the starting point and the first, second and third allocated areas.

Figure 1:
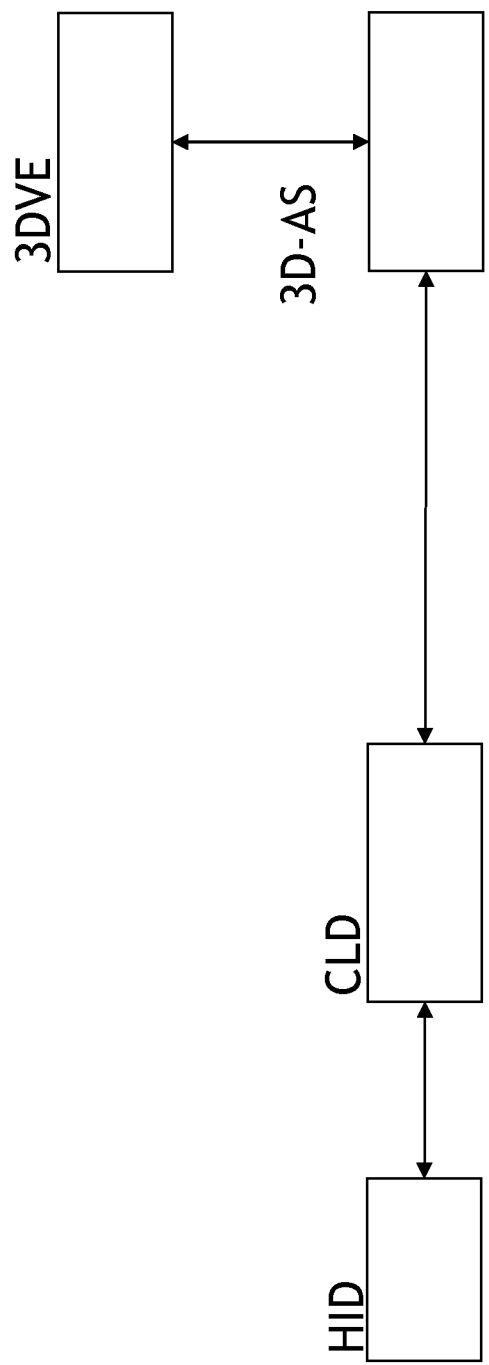
FIG. 1 represents a system for controlling motion of an object in a 3-dimensional Virtual Environment with devices and coupling networks wherein the implementation of the present invention is realized.
Figure 2:
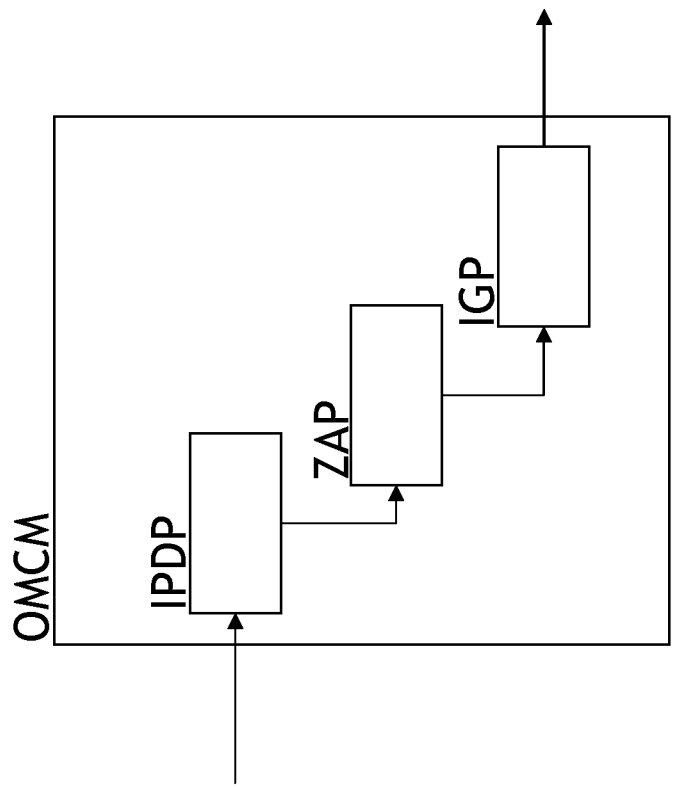
FIG. 2 represents the functional structure of an Object Motion control Module, for use in the system for controlling motion of an object in a 3-dimensional Virtual Environment according to the present invention.

In the following paragraphs, referring to the drawings, an implementation of the system for controlling motion of an object in a 3-dimensional Virtual Environment and the related devices according to the present invention will be described. In the first paragraph of this description the main elements of this network with its functional parts as presented in respective figures, FIG. 1 and FIG. 2 are described. In the second paragraph, all connections between the before mentioned network elements and described functional parts are defined. In the succeeding paragraph the actual execution of system for controlling motion of an object in a 3-dimensional Virtual Environment is described.

An essential element of this embodiment of the present invention, as presented in FIG. 1, is an application server 3D-AS that deploys the 3-dimensional Virtual Environment 3DVE like Second Life Second Life, Wonderland, OpenCroque, Solipsys or any other 3D virtual environments/worlds. Although for reasons of simplicity only one application server 3D-AS is shown, usually there is more then one such application server. Further there is a client device CLD for accessing the 3-dimensional Virtual Environment where the client device CLD usually is a personal computer, a mobile PC like a personal Digital Assistant, or a mobile phone etc. where the client device CLD having internet access via DSL, cable, WiFi or otherwise. The client device CLD usually also executes a client application for accessing the 3-Dimensional Virtual Environment 3DVE like Second Life.

In order to control the motion of objects like user avatars in such 3-dimensional Virtual Environment 3DVE there is a Human interface device HID, in our present invention a mobile communications device having a touch screen, which alternatively also may be the touch pad of a laptop computer or even a mouse that is used for controlling the client device CLD. It is important to note that the interaction mechanism as disclosed in the present invention does not require rendering the 3D environment on the Human interface device HID nor require direct eye contact of the end user with the Human interface device HID.

The Human interface device HID may be coupled to client device CLD over a wired or wireless connection. Wired connections may be USB, Firewire, serial-port, Ethernet, fibre or any other connection. Wireless connection technologies compromise wifi, wimax, Bluetooth, infrared, 3G, LTE or any other wireless connections. The client device CLD may be coupled to the Application server 3D-AS over an internet connection or any other suitable connection like intranet, Bluetooth, wifi, wimax, 3G network, etc directly or indirectly, e.g. being coupled over an access network.

In addition the client device CLD or the application server 3D-AS may include the Object Motion control Module OMCM for translating input data from the HID to the intended motion of the object within the 3-dimensional world. In the alternative the functionality of the Object Motion control Module OMCM may be distributed over the client device CLD, the Application server 3D-AS and any further intermediate device.

The Object Motion control Module OMCM first comprises an initial pointer detection part IPDP that is able to determine a starting point on a 2-dimensional surface by detecting a location of a pointer on the 2-dimensional surface where the surface may be the touchpad of a laptop computer device or the touch sensitive screen of a PDA. Alternatively, in case of a mouse as a human interface device HID moving over a desk or another surface being the 2-dimensional surface where the pressing of a mouse button indicates the starting point of the interaction.

Furthermore there is a zone allocation part ZAP that is adapted to allocate based on the starting point determined, a first (circular) area on the surface surrounding the starting point, a second (circular) area, on the surface, surrounding the first area and a third (circular) area on the surface, surrounding the second area and an object motion control instruction generating part IGP that is able to generate an object motion control instruction based on a motion of the pointer and additionally based on an object motion control function that is associated to each of the allocated areas wherein said motion occurs.

It is to be noted that although in FIG. 3a and FIG. 3b the allocated areas I, II, III are presented as circular, each such area may instead of circular be triangular, rectangular or have any other suitable shape. In this embodiment, these allocated areas are assumed to be circular although other suitable shapes may be chosen instead.

The meant object motion control function in this method and system implies:

1. no motion of the object in the 3-dimensional Virtual Environment if the motion of the pointer is detected within the first (circular) area; or 2. the motion of the object in the 3-dimensional Virtual Environment is an angular motion, where the angular velocity of the motion of the object is derived from the motion of the pointer if the motion of the pointer is determined/detected within the second (circular) area; or 3. the motion of the object 3-dimensional Virtual Environment is a rotational and linear motion where the rotational and linear velocity of the motion is derived from the motion of the pointer if the motion of the pointer is detected within the third area.

The Object Motion control Module OMCM has an input-terminal $I_2$ that is at the same time an input terminal of the initial pointer detection part IPDP that is coupled to the zone allocation part ZAP that further is coupled to the object motion control instruction generating part IGP. The object motion control instruction generating part IGP has an output-terminal that is at the same time an output-terminal of the Object Motion control Module OMCM.

In order to explain the execution of the present invention it is supposed that a user is browsing a 3-dimensional virtual environment 3DVE like Second Life or Wonderland, using his human interface device HID e.g. the touch sensitive surface of his PDA or even the touch screen coupled to his client device CLD, e.g. a personal computer, a gaming console or a public terminal equipped with a screen and using a client application for browsing a 3-dimensional virtual environment 3DVE.

It is supposed that the user starts browsing Second Life and wishes to wander, with his avatar through Second Life. In order to control the motion of the avatar in Second Life, the user starts touching with a finger or pointing device the touch sensitive surface at a certain location depending on the intended interaction. The initial pointer detection part IPDP determines based on this first touch a starting point on the 2-dimensional surface by detecting the initial location of the pointer on the 2-dimensional surface, i.e. the touch-screen. Based on this determined starting point, the zone allocation part ZAP allocates a first area on the touch-screen surface surrounding the starting point, a second area, on the touch-screen surface, surrounding the first area and a on the touch-screen surface, surrounding the second area.

It is to be noted that each such area may be circular, triangular, rectangular or have any other suitable shape. In this embodiment, these areas are assumed to be circular although other suitable shapes may be chosen instead.

The position of these three earlier mentioned allocated sensitive areas is derived from the location on the touch sensitive area where the pointer i.e. a finger is initially posed on the touch sensitive surfaces and these allocated sensitive areas remain at the same position as long as the pointer, i.e. a finger is being dragged on the surface.

These allocated areas i.e. bounded by circles in this embodiment, may appear as visual feedback on the touch sensitive surface if it is also capable of displaying graphics like on a regular touch screen but this is not mandatory, to save battery life.

Further, the motion of the finger or pointing device on the touch sensitive surface is tracked and based on this motion in combination with the object motion control function that is associated to the area wherein this motion occurs, the object motion control instruction generating part IGP generates an object motion control instruction.

If the user's finger or pointing device is moving within the first (circular) area then no object motion control instruction is generated by the object motion control instruction generating part (IGP). If the users finger or pointing device is sliding outside first the (inner) area and then returns back into the first area or looses contact with the touch sensitive surface (e.g. finger raised) then an object motion control instruction is generated by the IGP to stop moving the object.

This object motion control instruction generating part IGP generates an object motion control instruction instructing the 3-dimensional virtual environment 3DVE, that there is no move of the object at all.

If the user's finger or pointing device subsequently is moved from the first area into and within the second circular area, the motion of the object in the 3-dimensional Virtual Environment is, in accordance with the object motion control function associated to this area, an angular motion. The object motion control function that is associated to the second area (outside the first area and outside third area) is that an angular motion only is enforced onto the object of the 3-dimensional virtual environment 3DVE, where a normalized angular velocity is derived from the variations in the amplitude and sign of $\Delta\theta$ (see FIG. 3a), the angle formed by the current position of the finger outside the first area, the center of the circle and the point where the dragged finger initially crossed the boundary of the first circle. If the amplitude of $\Delta\theta$ grows, the angular speed increases. If the amplitude of $\Delta\theta$ shrinks, the angular speed decreases. If the sign of $\Delta\theta$ changes then the direction of the angular rotation will change.

Subsequently the user may drag his finger or pointing device outside the second area into the third area which also may be referred to as outermost "rotation & linear motion-sensitive area".

The object motion control instruction generating part IGP then generates an additional linear object motion control instruction based on the motion within the third area and the object motion control function associated to this third area, where this object motion control function entails a normalized linear motion component in addition to the rotational motion derived when the pointing device left the most inner circle. When the finger is dragged outside the second circle, the direction of the linear motion relative to the object's current orientation is derived from the direction v (see FIG. 3b), the vector drawn from the center of the circles to the point where the finger originally left the first circle. The relative direction is fixed as long as the pointing device is dragged on the surface outside the first circle. It is reset if the finger is not dragged anymore on the surface or returns inside the first circle. Outside the second area (circle), the normalized velocity is derived from the variations of the length of the segment $\Delta R$ that represents the distance between the point where the finger is currently dragged and the second circle. The further from the center the finger is dragged, the faster the avatar will move. The closer to the second circle the finger is dragged, the slower the avatar will move. If the finger is dragged back inside the second circle, the object motion control function instructs to stop linear motions.

For example, when the finger is dragged into the third area:
A vector v pointing northwards $\Delta R>0$ and $\Delta\theta=0$ corresponds to avatar walking forward.
A vector v pointing northwards $\Delta R>0$ and $\Delta\theta>0$ corresponds to avatar walking forward and rotating towards the left at the same time.
A vector v pointing northwards, $\Delta R>0$ and $\Delta\theta<0$ corresponds to avatar walking forward and rotating towards the right at the same time.
A vector v pointing eastwards, $\Delta R>0$ and $\Delta\theta=0$ corresponds to avatar strafing rightward.

The sensitivity of the normalized motion generated by the object motion control function can be configured through a user interface to suit user's usability requirements and the associated data generated can be adapted to the specific data representation and protocols accepted by the 3D application specific CLD interface.

An additional button of the human interface device HID can be assigned for enforcing motions of the object within 3-dimensional virtual environment 3DVE from the ground plane for instance for jumping or flying.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is merely made by way of example and not as a limitation on the scope of the invention, as defined in the appended claims.

The invention claimed is:

1. A method for controlling motions of an object in a 3-dimensional Virtual Environment by a Human Interface Device (HID) of a user browsing said 3-dimensional Virtual Environment, said human interface device (HID) being coupled to a client device (CLD) for accessing said 3-dimensional Virtual Environment, said 3-dimensional Virtual Environment being deployed at, at least one application server (3D-AS), said client device (CLD) and said at least one application server (3D-AS) being coupled over a communication link, wherein said method comprises:
determining a starting point at a 2-dimensional surface by detecting a location of a pointer at said 2-dimensional surface; and
based on said starting point allocating a first area on said surface surrounding said starting point, said first area being associated with a first motion control function, a second area on said surface, surrounding said first area, said second area being associated with a second motion control function, and a third area on said surface, surrounding said second area, said third area being associated with a third motion control function; and
generating an object motion control instruction based on said motion of said pointer and the object motion control function associated with the area wherein said motion is detected.

2. The method for controlling motions of an object in said 3-dimensional Virtual Environment according to claim 1, wherein:
said first motion control function comprises providing no motion of said object in said 3-dimensional Virtual Environment if said motion of said pointer is detected within said first area; or
said second motion control function comprises said motion of said object in said 3-dimensional Virtual Environment is only an angular motion, where said angular velocity is derived from said motion of said pointer if said motion of said pointer is detected within said second area; and
said third motion control function comprises said motion of said object in said 3-dimensional Virtual Environment is a rotational and/or linear motion where the velocity of said rotational and/or linear motion is derived from said motion of said pointer if said motion of said pointer is detected within said third area.

3. The method for controlling motions of an object in said 3-dimensional Virtual Environment according to claim 1, wherein said human interface device (HID) is a client device having a touch sensitive surface where said step of determining said starting point at a 2-dimensional surface is detecting a location of said pointer at said 2-dimensional surface of said touch sensitive surface.

4. The method for controlling motions of an object in said 3-dimensional Virtual Environment according to claim 1, wherein said human interface device (HID) is a computer mouse, said determining said starting point at a 2-dimensional surface comprises detecting an initial starting point of said mouse moving on a 2-dimensional surface by detecting a click of a mouse button.

5. A system for controlling motions of an object in a 3-dimensional Virtual Environment application, said system comprising a human interface device (HID), for browsing said 3-dimensional Virtual Environment, for controlling said motions of said object, and said system further comprising at least one application server (3D-AS) for deploying said 3-dimensional Virtual Environment application, wherein said system comprises:
an initial pointer detection part (IPDP) adapted to determine a starting point at a 2-dimensional surface by detecting a location of a pointer at said 2-dimensional surface; and
a zone allocation part (ZAP), adapted to allocate based on said determined starting point, a first area on said surface surrounding said starting point, said first area being associated with a first motion control function, a second area, on said surface, surrounding said first area, said second area being associated with a second motion control function, and a third area on said surface, surrounding said second area, said third area being associated with a third motion control function; and
an object motion control instruction generating part (IGP), adapted to generate an object motion control instruction based on a motion of the pointer and the object motion control function associated with the area wherein said motion occurs.

6. The system for controlling motions of an object in a 3-dimensional Virtual Environment according to claim 5, wherein:
said associated first motion control function comprises providing no motion of said object in said 3-dimensional Virtual Environment if said motion of said pointer is detected within said first area; or
said associated second motion control function comprises said motion of said object in said 3-dimensional Virtual Environment is only an angular motion, where said angular motion is derived from said motion of said pointer if said motion of said pointer is detected within said second area; and
said associated third motion control function comprises said motion of said object 3-dimensional Virtual Environment is a rotational and/or a linear velocity where said rotational and/or linear velocity is derived from said motion of said pointer if said motion of said pointer is detected within said third area.

7. An Object Motion control Module (OMCM), for use in a system for controlling motions of an object in a 3-dimensional Virtual Environment, wherein said Object Motion control module (OMCM) comprises:
an initial pointer detection part (IPDP) adapted to determine a starting point at a 2-dimensional surface by detecting a location of a pointer at said 2-dimensional surface;
a zone allocation part (ZAP), adapted to allocate, based on said determined starting point, a first area on said surface surrounding said starting point, said first area being associated with a first motion control function, a second area, on said surface, surrounding said first area, said second area being associated with a second motion control function and a third area on said surface, surrounding said second area, said third area being associated with a third motion control function; and
an object motion control instruction generating part (IGP), adapted to generate an object motion control instruction based on a motion of said pointer and the object motion control function associated with an area of said first, second and third areas wherein said motion occurs.

8. The Object Motion control Module (OMCM), according to claim 7, wherein:
said associated first motion control function comprises providing no motion of said object in said 3-dimensional Virtual Environment if said motion of said pointer is/detected within said first area; or
said associated second motion control function comprises said motion of said object in said 3-dimensional Virtual Environment is only an angular motion, where said angular motion is derived from said motion of said pointer if said motion of said pointer is/detected within said second area; and
said associated third motion control function comprises said motion of said object 3-dimensional Virtual Environment is a rotational and/or linear motion where said rotational and linear velocity is derived from said motion of said pointer if said motion of said pointer is determined/detected within said third area.

9. A client device (CLD), wherein said client device comprises the object Motion Control module of claim 7.

10. A Human interface device (HID), wherein said Human Interface Device (HID) comprising the object Motion Control module of claim 7.

* * * * *